United States Patent
Bhattacharjee et al.

(10) Patent No.: US 8,792,443 B2
(45) Date of Patent: *Jul. 29, 2014

(54) METHOD AND APPARATUS FOR SERVICE CAPABILITY MODIFICATION

(75) Inventors: Supratik Bhattacharjee, San Diego, CA (US); Nathan E. Tenny, Poway, CA (US); Sanjay Kenchareddy, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 172 days.

This patent is subject to a terminal disclaimer.

(21) Appl. No.: 13/362,888

(22) Filed: Jan. 31, 2012

(65) Prior Publication Data

US 2012/0195249 A1   Aug. 2, 2012

Related U.S. Application Data

(63) Continuation of application No. 11/853,717, filed on Sep. 11, 2007, now Pat. No. 8,130,705.

(60) Provisional application No. 60/844,753, filed on Sep. 15, 2006.

(51) Int. Cl.
*H04W 4/00* (2009.01)

(52) U.S. Cl.
USPC ............ 370/329; 455/414.1; 455/435.1; 455/435.2; 455/435.3; 455/450; 455/452.1; 455/452.2; 455/550.1; 455/552.1; 370/236; 370/236.1; 370/252; 370/328; 370/330; 370/432; 370/469

(58) Field of Classification Search
USPC ............ 455/414.1, 435.1, 435.2, 435.3, 450, 455/452.1, 452.2, 550.1, 552.1; 370/236, 370/236.1, 252, 254, 328, 329, 330, 432, 370/469

See application file for complete search history.

(56) References Cited

U.S. PATENT DOCUMENTS

| 6,101,392 | A  | 8/2000  | Corriveau        |
|-----------|----|---------|------------------|
| 6,333,947 | B1 | 12/2001 | van Heeswyk et al. |
| 6,671,511 | B1 | 12/2003 | Forssell et al.  |
| 6,678,517 | B2 | 1/2004  | Naim et al.      |
| 6,721,562 | B2 | 4/2004  | Kelley           |
| 6,892,076 | B2 | 5/2005  | Maalismaa et al. |
| 6,898,429 | B1 | 5/2005  | Vialen et al.    |

(Continued)

FOREIGN PATENT DOCUMENTS

| CN | 1521956 A | 8/2004 |
| CN | 1666554 A | 9/2005 |

(Continued)

OTHER PUBLICATIONS

3GPP TS 25.306 V6.8.0 3rd Generation Partnership Project; Technical Specification Group Radio Access Network; UE Radio Access capabilities (Release 6) (Mar. 2006) pp. 1-33.

(Continued)

*Primary Examiner* — Olumide T Ajibade Akonai
(74) *Attorney, Agent, or Firm* — S. Hossain Beladi

(57) ABSTRACT

A method includes determining, at a receiving station, a modified capability for maintaining reception of a service while supporting a broadcast service. The modified capability is a modification of a capability associated with the service. The method further includes communicating an indication of the modified capability to a transmitting station.

39 Claims, 6 Drawing Sheets

(56) References Cited

U.S. PATENT DOCUMENTS

| | | |
|---|---|---|
| 6,909,703 B2 | 6/2005 | Terry et al. |
| 7,099,689 B2 | 8/2006 | Bahl et al. |
| 7,123,590 B2 | 10/2006 | Mir et al. |
| 7,158,810 B2 | 1/2007 | Schwarz et al. |
| 7,177,658 B2 | 2/2007 | Willenegger et al. |
| 7,184,792 B2 | 2/2007 | Mir |
| 7,260,080 B2 | 8/2007 | Suumaki et al. |
| 7,272,120 B2 | 9/2007 | Rajkotia |
| 7,321,780 B2 | 1/2008 | Love et al. |
| 7,340,615 B2 | 3/2008 | Krantz et al. |
| 7,352,698 B2 | 4/2008 | Niwano et al. |
| 7,433,334 B2 | 10/2008 | Marjelund et al. |
| 7,647,033 B2 | 1/2010 | Uozumi et al. |
| 7,693,543 B2 | 4/2010 | Schwarz et al. |
| 7,804,837 B2 | 9/2010 | Maansaari et al. |
| 7,907,560 B2 | 3/2011 | Jang et al. |
| 7,991,387 B2 | 8/2011 | Rowley et al. |
| 8,130,705 B2 | 3/2012 | Bhattacharjee et al. |
| 8,169,973 B2 | 5/2012 | Palenius et al. |
| 2001/0010685 A1 | 8/2001 | Aho |
| 2001/0026538 A1 | 10/2001 | Bruss |
| 2002/0045458 A1 | 4/2002 | Parantainen et al. |
| 2003/0224820 A1 | 12/2003 | Einola et al. |
| 2004/0002366 A1 | 1/2004 | Cromer et al. |
| 2004/0047328 A1 | 3/2004 | Proctor et al. |
| 2004/0081115 A1 | 4/2004 | Parsa et al. |
| 2004/0198369 A1 | 10/2004 | Kwak et al. |
| 2005/0128956 A1 | 6/2005 | Hsu et al. |
| 2006/0019647 A1 | 1/2006 | Muhonen et al. |
| 2006/0133307 A1 | 6/2006 | Fukasawa et al. |
| 2006/0211425 A1 | 9/2006 | Bae et al. |
| 2006/0229102 A1 | 10/2006 | Kitazoe et al. |
| 2006/0262732 A1 | 11/2006 | Joutsenvirta et al. |
| 2007/0207794 A1* | 9/2007 | Dunko ............... 455/419 |
| 2007/0224990 A1 | 9/2007 | Edge et al. |
| 2007/0254647 A1 | 11/2007 | Salkintzis |
| 2008/0144582 A1 | 6/2008 | Das et al. |
| 2008/0274739 A1 | 11/2008 | Wu |
| 2008/0300027 A1 | 12/2008 | Dou et al. |
| 2009/0077395 A1 | 3/2009 | Tsai |
| 2009/0129339 A1 | 5/2009 | Young et al. |
| 2009/0141783 A1 | 6/2009 | Kirrmann |
| 2009/0149162 A1 | 6/2009 | Tenny |
| 2009/0180414 A1 | 7/2009 | Maeda et al. |
| 2009/0196259 A1 | 8/2009 | Pani et al. |
| 2009/0270109 A1 | 10/2009 | Wang et al. |
| 2010/0034094 A1 | 2/2010 | Tenny |
| 2010/0182963 A1 | 7/2010 | Fischer et al. |
| 2010/0183051 A1 | 7/2010 | Margarit |
| 2011/0099287 A1 | 4/2011 | Manor |

FOREIGN PATENT DOCUMENTS

| | | |
|---|---|---|
| EP | 1437912 A1 | 7/2004 |
| EP | 1679914 A1 | 7/2006 |
| EP | 1750469 A1 | 2/2007 |
| JP | 2000152337 A | 5/2000 |
| JP | 2002164838 A | 6/2002 |
| JP | 2004320240 A | 11/2004 |
| JP | 2005073261 A | 3/2005 |
| JP | 2005525032 A | 8/2005 |
| JP | 2005528050 A | 9/2005 |
| JP | 2005536091 A | 11/2005 |
| JP | 2006020339 A | 1/2006 |
| JP | 2006054856 A | 2/2006 |
| JP | 2006129440 A | 5/2006 |
| JP | 2006516870 A | 7/2006 |
| JP | 2006520170 A | 8/2006 |
| JP | 2008503910 A | 2/2008 |
| JP | 2009504041 A | 1/2009 |
| KR | 20040086972 A | 10/2004 |
| KR | 20050020458 A | 3/2005 |
| KR | 100606047 | 7/2006 |
| KR | 20060104258 A | 10/2006 |
| TW | I253245 B | 4/2006 |
| TW | I259000 B | 7/2006 |
| WO | WO9963682 A2 | 12/1999 |
| WO | WO0054536 A1 | 9/2000 |
| WO | 2004004407 A1 | 1/2004 |
| WO | 2004017540 A1 | 2/2004 |
| WO | 2004082094 A2 | 9/2004 |
| WO | 2005020618 A1 | 3/2005 |
| WO | WO2005079097 A1 | 8/2005 |
| WO | WO2005107311 A1 | 11/2005 |
| WO | 2006010312 A1 | 2/2006 |
| WO | WO2006086497 A1 | 8/2006 |
| WO | 2007014630 A1 | 2/2007 |
| WO | WO2007025138 A2 | 3/2007 |
| WO | 2007144956 A1 | 12/2007 |
| WO | WO2008043078 A2 | 4/2008 |

OTHER PUBLICATIONS

3GPP: "3GPP TR 25.813 v7.0.0 (Jun. 2006) 3rd Generation Partnership Project; Technical E Access Network; Evolved Universal Terrestrial Radio Access (E-Utra) and Evolved Univers Network (E-UTRAN); Radio interface protocol aspects (Release 7)" 3RD Generation P1 (3GPP); Technical Report (TR), XX, XX, vol. 25.813, no. WOO, Jun. 19, 2006 (2006-C XP002426125 cited in the application.

Anonymous: "Extract from: 3GPP TS 25.331 V6.10.0 (Jun. 2006) Technical Specification Project; Technical Specification Group Radio Access Network; Radio Resource Control (RR (Release 6), chapter 8.2.2.3 and 8.5.26" 3GPP, (Online) Jun. 2006, XP002468797 Publication Retrieved from the Internet:URL:ftp://ftp.3gpp.org/specs/archive/25_series/2: Feb. 13, 2008) cited in the application.

Ericsson: "Proposed changes to the RRC protocol specifcation regarding RRC connection establishment and re-establishment procedures" 3GPP Draft; R2-99417, 3RD Generation Partnership Project (3GPP), Mobile Competence Centre ; 650, Route Des Lucioles ; F-06921 Sophia-Antipolis Cedex ; France, vol. RAN WG2, no. Berlin; 19990521, May 21, 1999, XP050112770 [retrieved on May 21, 1999] the whole document.

International Search Report, PCT/US2007/078260, International Search Authority, European Patent Office—Mar. 3, 2008.

Nokia, DoCoMo: "Stage_2_Description of UE capability_for E-UTRAN," 3GPP TS-RAN R2-062211 (Online), Sep. 1, 2006 (2-006-09:01), XP002468908 Internet Publicat Internet:URL:http://www.3gpp.org/ftp/tsg_ran/WG2_RL2/TSGR2_54/Documents/ > (retrieved.

Qualcomm Europe: "3GPP TSG-RAN WG2 meeting #55: R2-062961: Framework for UE LTE" (Online) Oct. 13, 2006, XP002468961 Internet Publication Retr URL:http://www.3gpp.org/ftp/tsg_ran/Wg2_RL2/TSGR2_55/Documents/ > chapter 2.1 and 2.2.

Universal Mobile Telecommunications System (UMTS); UE Radio Access capabilities definition (3GPP TS 25.306 version 7.0.0 Release 7): ETSI TS 125 306 ETSI Standards, European Telecom,Standards Institute, Sophia-Antipo, FR, vol. 3-R2, No. V700, Mar. 2006, XP014034281, ISSN: 0000-0001 cited in the applications chapter 4.5.1, in particular p. 8, lines 9-14.

Written Opinion, PCT/US07/078260, International Search Authority, European Patent Office, Mar. 3, 2008.

Taiwan Search Report—TW096134618—TIPO—Mar. 15, 2012.

Panasonic, "MBMS UE capability", [online], 3GPP TSG RAN WG1 #38bis, Sep. 20, 2004, R1-041233, Retrieved from the Internet: URL: http://www.3gpp.org/ftp/tsg_ran/WG1_RL1/TSGR1_38bis/Docs/R1-041233.zip, (2011-10051-162).

"Universal Serial Bus Usage Tables for HID Power Devices", Nov. 1, 1997, pp. 1-66, XP55081132, Retrieved from the Internet: URL : http://www.usb.org/developers/devclass_docs/pdcv10.pdf.

* cited by examiner

METHOD AND APPARATUS FOR SERVICE CAPABILITY MODIFICATION

CROSS-REFERENCE TO RELATED APPLICATIONS

This application claims priority from and is a continuation of U.S. patent application Ser. No. 11/853,717 filed Sep. 11, 2007, which claims priority to U.S. Provisional Application No. 60/844,753, filed Sep. 15, 2006, the contents of both of which are expressly incorporated by reference herein in their entirety.

BACKGROUND

1. Field

The present invention relates generally to wireless communications, and more specifically to the modification of service capability to support simultaneous reception of services.

2. Background

In a wireless communication system, mobile stations, also known as user equipment (UE), may communicate using dedicated communication services. These dedicated communication services provide two-way communication between UE and a wireless network system. The dedicated communication services may occur at various transmission rates that are either defined or negotiated at some point in time after the UE is recognized in the system. Another commonly available communication service for sharing information in a one-to-many type arrangement has come to be known generally as a broadcast service. One of the commonly defined and accepted broadcast communication services is known as the Multimedia Broadcast/Multicast Service (MBMS).

Simultaneous support for a dedicated service (e.g., packet data or voice) and MBMS in a single UE has been nominally defined. A UE with the capacity to support simultaneous dedicated services (voice calls, PS data, etc.) and MBMS will necessarily have some limitations on the level of services it can simultaneously support. At a minimum, the UE Radio Access Capabilities requirement specifies that a UE be able to support a dedicated service of 64 kbps downlink data rate in parallel with reception of an MBMS. (See 3GPP Technical Specification 25.306.)

However, beyond this minimum benchmark, there are no defined levels of support—thus, for instance, even if a UE can support 384 kbps together with MBMS, there is no mechanism such as defined UE classes by which this support can be indicated to the network. Furthermore, conflict resolution of available services that exceed the UE capability have been limited to very general "service prioritization" procedures for maintaining and supporting only a single one of the services by releasing the other service. (See Radio Resource Control (RRC) Protocol Specification of 3GPP Technical Specification 25.331.)

Therefore, there is a need for a UE to determine the available competing service requirements and to manage utilization of these services within the UE in view of the available capabilities of the UE.

SUMMARY

Techniques to allow a UE to modify the UE's represented or available capabilities and for allocating a portion of the UE's actual capabilities for simultaneously supporting a second service are disclosed. Devices, methods, systems and media for performing the same are also disclosed.

In one embodiment, a method for supporting a dedicated service is disclosed. The method includes determining a modified capability offered to maintain the dedicated service while supporting a second service. The method further includes disclosing to a system the modified capability as the available capability for reconfiguring the dedicated service.

In another embodiment, a wireless communication device is disclosed. The wireless communication device includes a memory and a processor coupled with the memory. The processor is configured to determine a modified capability to maintain a dedicated service while supporting a second service; and to disclose to a system the modified capability as the available capability for reconfiguring the dedicated service.

In yet another embodiment, an apparatus includes a means for determining a modified capability offered to maintain a dedicated service while supporting a second service. The apparatus further includes a means for disclosing to a system the modified capability as the available capability for reconfiguring the dedicated service.

In a further embodiment, a method for supporting a plurality of services is disclosed. The method includes establishing a dedicated service according to a first capability and reconfiguring the dedicated service according to a second capability. The method further includes establishing a simultaneous second service using at least a portion of the first capability.

In yet a further embodiment, a processor readable medium is disclosed. The processor readable medium includes instructions thereon that may be utilized by one or more processors. The instructions are for determining a modified capability offered to maintain the dedicated service while supporting a second service and for disclosing to a system the modified capability as the available capability for reconfiguring the dedicated service.

DETAILED DESCRIPTION

Figure 1:
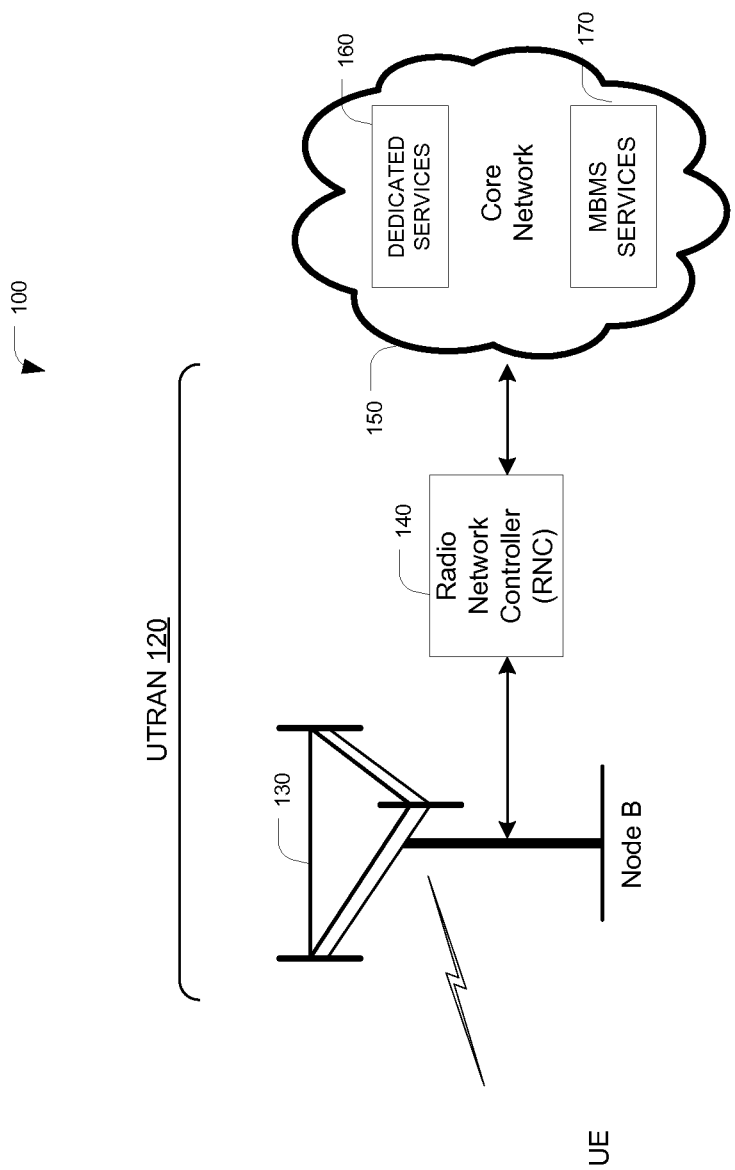
FIG. 1 shows a diagram of a network 100, in accordance with an embodiment of the present invention.

Various embodiments are now described with reference to the drawings, wherein like reference numerals are used to refer to like elements throughout. In the following description, for purposes of explanation, numerous specific details are set forth in order to provide a thorough understanding of one or more embodiments. It may be evident, however, that such embodiment(s) may be practiced without these specific details. In other instances, well-known structures and devices are shown in block diagram form in order to facilitate describing one or more embodiments.

In the following description, certain terminology is used to describe certain features of one or more embodiments of the present invention. For instance, the terms "user equipment"

(UE), "mobile terminal," "mobile device," "wireless device," are interchangeably used to refer to mobile phones, pagers, wireless modems, personal digital assistants, personal information managers, palmtop computers, laptop computers, and/or other mobile communication/computing devices which communicate, at least partially, through a cellular or wireless network.

In third generation wireless mobile communication technology, Universal Mobile Telecommunication System (UMTS), also known as 3GSM (third generation Global System for Mobile Communications), is one communication protocol used for communications on a wireless network. One such type of wireless network is a UMTS Terrestrial Radio Access Network (UTRAN) which typically includes base stations and controllers to form the UMTS wireless network. This wireless communications network, commonly referred to as a 3G (for 3rd Generation) network, can carry many traffic types, from real-time circuit switched traffic to Internet Protocol (IP)-based packet switched. The UTRAN allows connectivity between UEs, such as mobile phones or wireless communication devices, and to devices on other communication networks.

Base stations typically include transmitters and receivers used to communicate directly with the UEs, which may move freely around a network. A Radio Network Controller (RNC) governs communication within the UTRAN by controlling the operation of the base stations on the network. The RNC carries out radio resource management and some of the mobility management functions of data sent to and from the UE.

Various factors determine the capabilities of the UE operating in the UTRAN. Factors such as processing capability of the UE, storage or buffering capability of the UE, enabled functionality of the UE and location of the UE determine the actual capability of the UE. These capabilities, generally known as "UE Capability," are also known as "Classmark Information," in relationship to other revisions or related standards. Therefore, in order to effectuate communication between the UE and the UTRAN, the network must know the capabilities of the mobile device.

In the UTRAN, the RNC can configure UEs operating within the network to operate according to particular communication system parameters. (See 3GPP Technical Specification 25.331.) For example, during initiation or reconfiguration, a Radio Bearer Reconfiguration message may be sent by the RNC to a UE that configures a transmitter and/or receiver in the UE to operate according to parameters (e.g., combination of transmitted and received data blocks, mapping between channels and services, etc.) sent in the Radio Bearer Reconfiguration message.

Accordingly, the various embodiments of the present invention provide a mechanism to allow a UE to modify the UE's represented or available capabilities for allocating a portion of the UE's actual capabilities for simultaneously supporting a Multimedia Broadcast/Multicast Service (MBMS). During an ongoing dedicated service, the UE is allowed to transmit a UE CAPABILITY INFORMATION message to inform the UTRAN of changes in its capabilities, however, conventional network behavior may be unpredictable. Accordingly, the various embodiments provide a mechanism for allowing the UE to adjust the data rate of an ongoing session of a dedicated service in response to the availability of broadcast services, such as an MBMS. In an example, a second session is a broadcast session.

FIG. 1 shows a diagram of a 3GPP/UMTS network 100 that includes a UTRAN 120 and a core network 150. A UE 110 communicates with a Node B 130 in UTRAN 120. As stated, UE 110 may be stationary or mobile and may also be referred to as a wireless device, a mobile station, a user terminal, a subscriber unit, a station, or some other terminology. UE 110 may be a cellular phone, a personal digital assistant (PDA), a handheld device, a wireless modem, and so on. The terms "UE," "wireless device," and "user," are used interchangeably herein. Node B 130 is generally a fixed station that communicates with the UEs and may also be referred to as a base station, an access point, or some other terminology of similar functionality.

Node B 130 provides communication coverage for a particular geographic area and supports communication for UEs located within the coverage area. A Radio Network Controller (RNC) 140 couples to Node B 130 and provides coordination and control for the Node B 130. Core network 150 may include various network entities and services, including dedicated services 160 and MBMS 170, that support various functions such as packet routing, user registration, mobility management, etc. UE 110 may communicate with Node B 130 on the downlink and/or uplink at any given moment. The downlink (or forward link) refers to the communication link from the Node B 130 to the UB, and the uplink (or reverse link) refers to the communication link from the UB to the Node B 130.

In UMTS, data is processed as one or more transport channels at a higher layer. The transport channels may carry data for one or more services, e.g., voice, video, packet data, and so on. The transport channels are mapped to physical channels at a physical layer or Layer 1 (L1). The physical channels are channelized with different channelization codes and are orthogonal to one another in code domain.

Generally, when a UE desires to establish a communication link, the UE sends a channel request to establish a dedicated session. Typically, the channel request includes limited information relating to the UE and the UE is said to be in a connected mode with the UTRAN and in a CELL_DCH state characterized by dedicated uplink and downlink channels. The UE then forwards a UE CAPABILITY INFORMATION message including UE capability information to the UTRAN. The UTRAN responds with a UE CAPABILITY ACK message noting the receipt of the UE capability information. The UE transitions into a dedicated physical channel state and exchange of data (e.g., packet data) over the dedicated services link then commences.

A conflict arises when additional services, such as MBMS 170, become available during the dedicated session of the dedicated services. A UE with the capacity to simultaneously support a dedicated service (e.g., packet data service, voice calls, etc.) and an MBMS will necessarily have some limitations on the level of services that can be simultaneously supported. In a typical situation, a UE might be in the CELL_DCH state for packet data service, with the UTRAN and hence the "bearer" supporting a downlink data rate of 384 kbps, when an MBMS becomes available to the UE. If the UE can support only a lesser dedicated service downlink, in addition to the processing demands of a MBMS, then conventional prioritization resulted in the UE determining which of the competing services would be supported and which would be either ignored or released.

In many cases, however, it would be possible to degrade or reduce the bit rate of the dedicated service to a level that allows the UE's processing resources to simultaneously service both a reduced-rate dedicated service and an MBMS without making an exclusive choice. In the example above, if the UE could somehow request the network to reconfigure the UTRAN for a downlink data rate of, for example, only 256 kbps, the UE could maintain the dedicated services and additionally simultaneously receive the MBMS transmission. Alternatively, if the MBMS quality could be diminished and yet remain acceptable, necessary dedicated service bandwidth could be maintained. While such degradation of bandwidth may not always be acceptable, many data services, such as file downloads, are adequately functional at a reduced data rate. Similarly, if the ongoing service is HSDPA, and the UE's category is such that the service is not compatible with MBMS reception (e.g., because of limited buffer memory), the UE might want to artificially lower its indicated category for the duration of the MBMS.

Figure 2A:
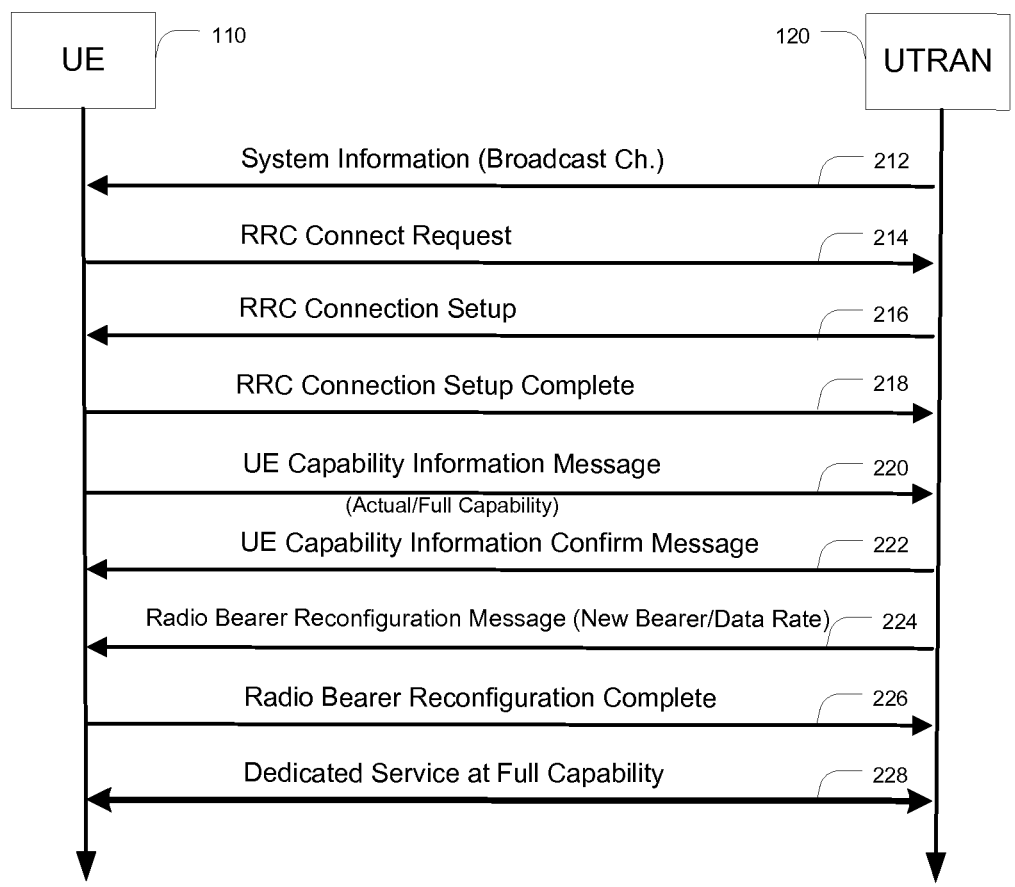
FIGS. 2A-2B illustrate a flowchart for facilitating simultaneous reception of services, in accordance with an embodiment of the present invention.
Figure 2B:
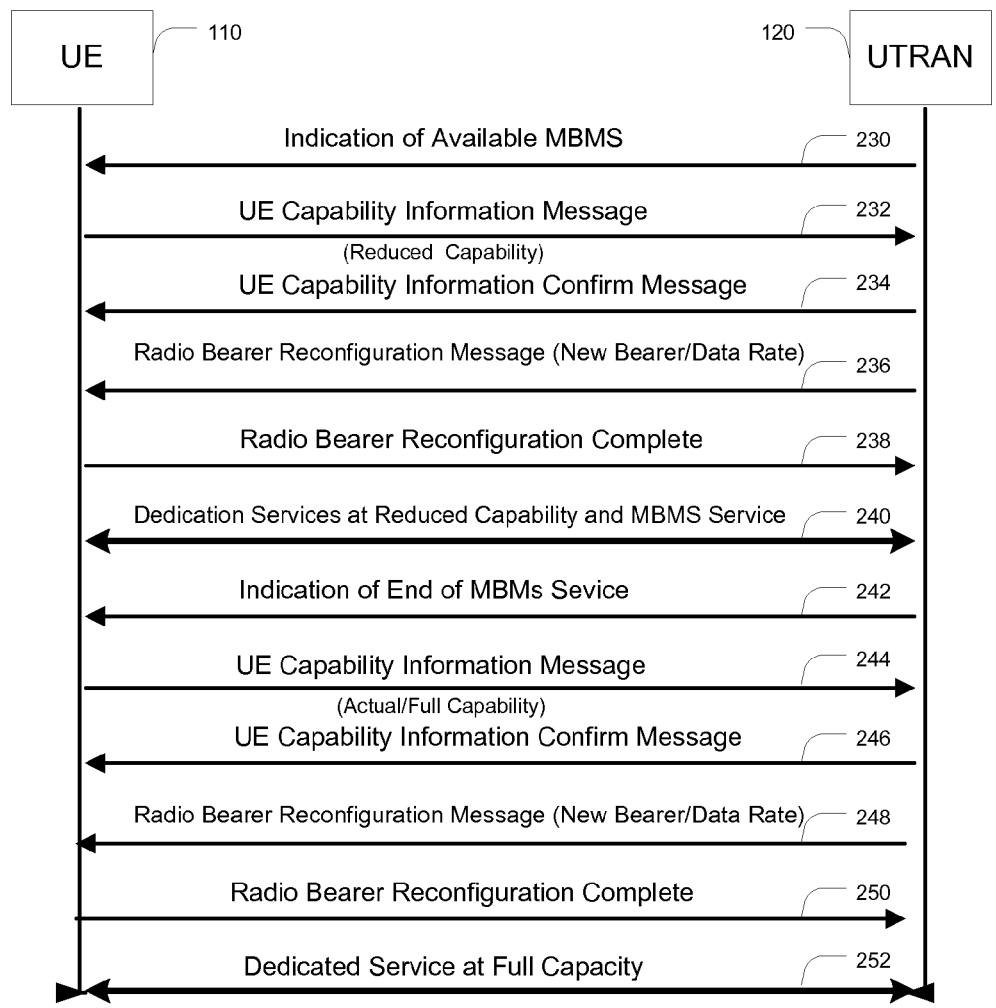

FIGS. 2A-2B illustrate an embodiment for facilitating simultaneous reception of services. Initially, the UE receives 212 system information sent on a broadcast channel. To initiate a call of any type, the UE sends 214 a request to establish a Radio Resource Control (RRC) connection via an RRC Connection Request message. The RRC connection may thereafter be established by an exchange 216 of an RRC Connection Setup message and an exchange 218 of an RRC Connection Setup Complete message between the UTRAN and UE. Steps 212 through 218 are performed for all types of calls.

Once assigned a dedicated channel, the UE informs the UTRAN, and more specifically the packet service (PS) bearer of the capabilities (e.g., processing/buffering capacity) of the UE. Accordingly, the UE sends 220 a USER CAPABILITY INFORMATION message including the UE's specific capabilities. The UTRAN informs the PS bearer (not individually shown) of the UE's specific capabilities. The UE's specific capabilities may include a data rate capability of, for example, 384 kbps. The UTRAN sends 222 a UE CAPABILITY INFORMATION CONFIRM message acknowledging receipt of the UE's capability information. After the UE's capabilities have been exchanged and confirmed, the UE waits to receive 224 a reconfiguration message from the bearer. Accordingly, the UE responds 226 with a radio bearer reconfiguration complete message and the dedicated services commence 228 according to the exchanged capabilities (e.g., packet data rate of, for example, 384 kbps).

As illustrated in FIG. 2B, during the course of engaging in the dedicated services between the UE and the UTRAN, the UE detects 230 an indication of an available MBMS. If the UE is capable of simultaneously sustaining both the MBMS and the dedicated service at the current data rate (i.e., at the data rate agreed during the exchange of the UE's specific capabilities), then the UE simultaneously services both (i) the dedicated service at the data rate of the previously agreed upon UE's capabilities, and (ii) the MBMS. However, if the UE has insufficient processing capability to simultaneously process both (i) the dedicated service according to the previously agreed upon UE's capabilities and (ii) the MBMS, then the UE seeks to reclaim some of the UE's processing obligation from the dedicated service by restating or redisclosing the UE's capability information to include modified capability information.

Specifically, once an MBMS has been detected 230 and when the capabilities of the UE are insufficient at current data rates to simultaneously process both services, the UE informs the UTRAN, and more specifically the PS bearer, that the UE desires to restate or redisclose the UE's capability information at the modified level. Accordingly, the UE sends 232 a USER CAPABILITY INFORMATION message including the UE's specific modified capabilities. By way of example, the UE's specific reduced capabilities may include a data rate capability of, or example, 256 kbps. The UTRAN sends 234 an UE CAPABILITY INFORMATION CONFIRM message acknowledging receipt of the UE's modified capability information. After the UE's capabilities have been exchanged and confirmed, the UE waits to receive 236 a reconfiguration message from the bearer. Accordingly, the UE responds 238 with a reconfiguration complete message and the dedicated services continues 240 according to the modified capabilities (e.g., packet data rate of, for example, 256 kbps).

If the dedicated session is still active when the MBMS concludes 242, the UE may reassign the available processing capability back to the dedicated service. Accordingly, the UE sends 244 a USER CAPABILITY INFORMATION message including the UE's specific capabilities. By way of example, the UE's specific capabilities may include a data rate capability of 384 kbps. The UTRAN sends 246 a UE CAPABILITY INFORMATION CONFIRM message acknowledging receipt of the UE's capability information. After the UE's capabilities have been exchanged and confirmed, the UE waits to receive 248 a reconfiguration message from the bearer. Accordingly, the UE responds 250 with a reconfiguration complete message and the dedicated services continue 252 according to the again modified capabilities (e.g., packet data rate of, for example, 384 kbps).

Figure 3:
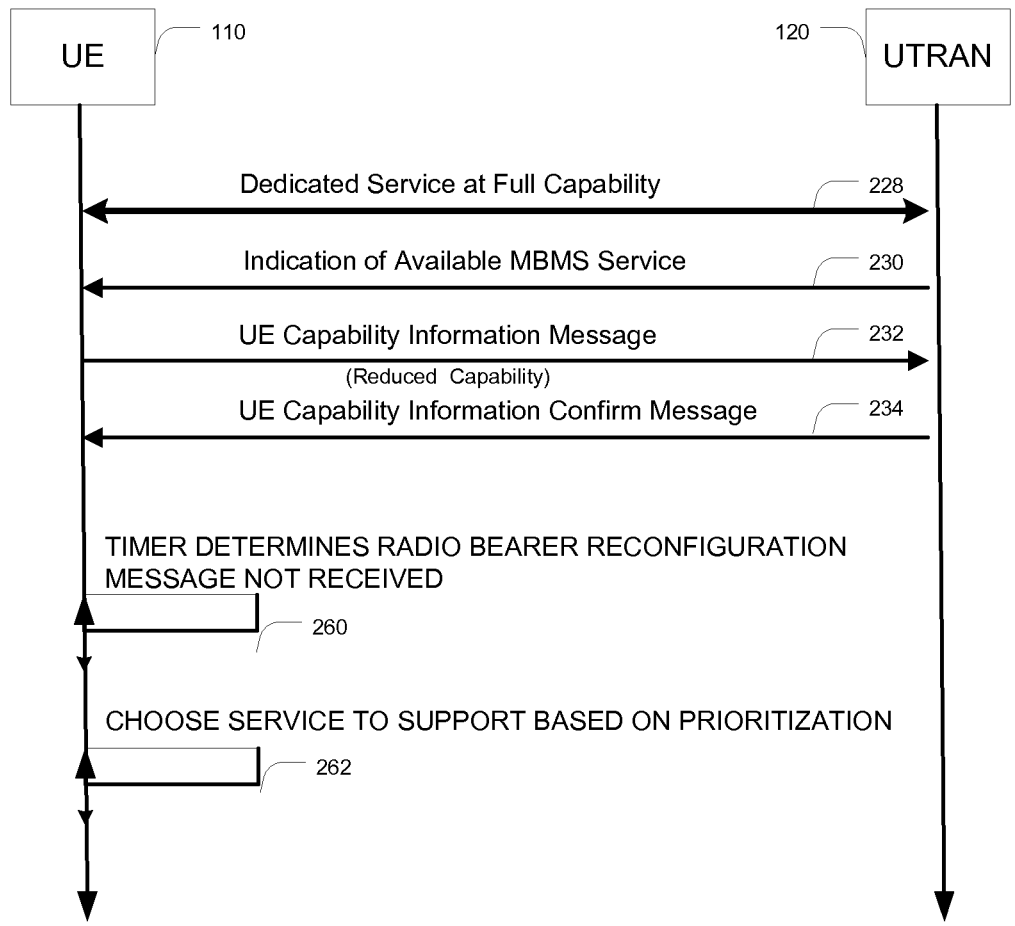
FIG. 3 illustrates a flowchart for conflict resolution of competing services, in accordance with an embodiment of the present invention.

FIG. 3 illustrates an embodiment for resolving conflicts in systems of varying ability to facilitate simultaneous receipt of services. While a UE capable of requesting modifications of previously stated capabilities may be configured accordingly, a UTRAN within which the UE may interact may have varying levels of sophistication and capability with regard to intrasession reconfigurations. In the present embodiment, a dedicated service has been commenced 228 as describe above with respect to FIGS. 2A-2B.

Similarly, during the course of engaging in the dedicated services between the UE and the UTRAN, the UE receives 230 an indication of an available MBMS. The UE determines the desirability of simultaneously supporting both the dedicated service and the MBMS, however, the capabilities (e.g., processing, storage, etc.) of the UE are inadequate of simultaneously sustaining both the MBMS and the dedicated service at the current data rate (i.e., at the data rate agreed during the exchange of the UE's specific capabilities).

Accordingly, once an MBMS has been detected 230 and when the capabilities of the UE are insufficient at current data rates to simultaneously process both services, the UE informs the UTRAN, and more specifically the PS bearer, that the UE desires to restate or redisclose the UE's capability information at a modified level. Accordingly, the UE sends 232 a USER CAPABILITY INFORMATION message including the UE's specific modified capabilities as describe above. The UTRAN sends 234 a UE CAPABILITY INFORMATION CONFIRM message acknowledging receipt of the UE's modified capability information. After the UE's capabilities have been exchanged and confirmed, the UE sets a timer and waits 260 to receive a reconfiguration message from the bearer. However, the UTRAN is incapable during an ongoing dedicated service to act upon the new capability information. Such an inability may result from programming deficiencies within the UTRAN or the specific bearer. Accordingly, the timer times out 260 in the UE since a reconfiguration message was never received from the bearer. The UE thereafter chooses 262 one of the services to support based on an internal prioritization.

Figure 4:
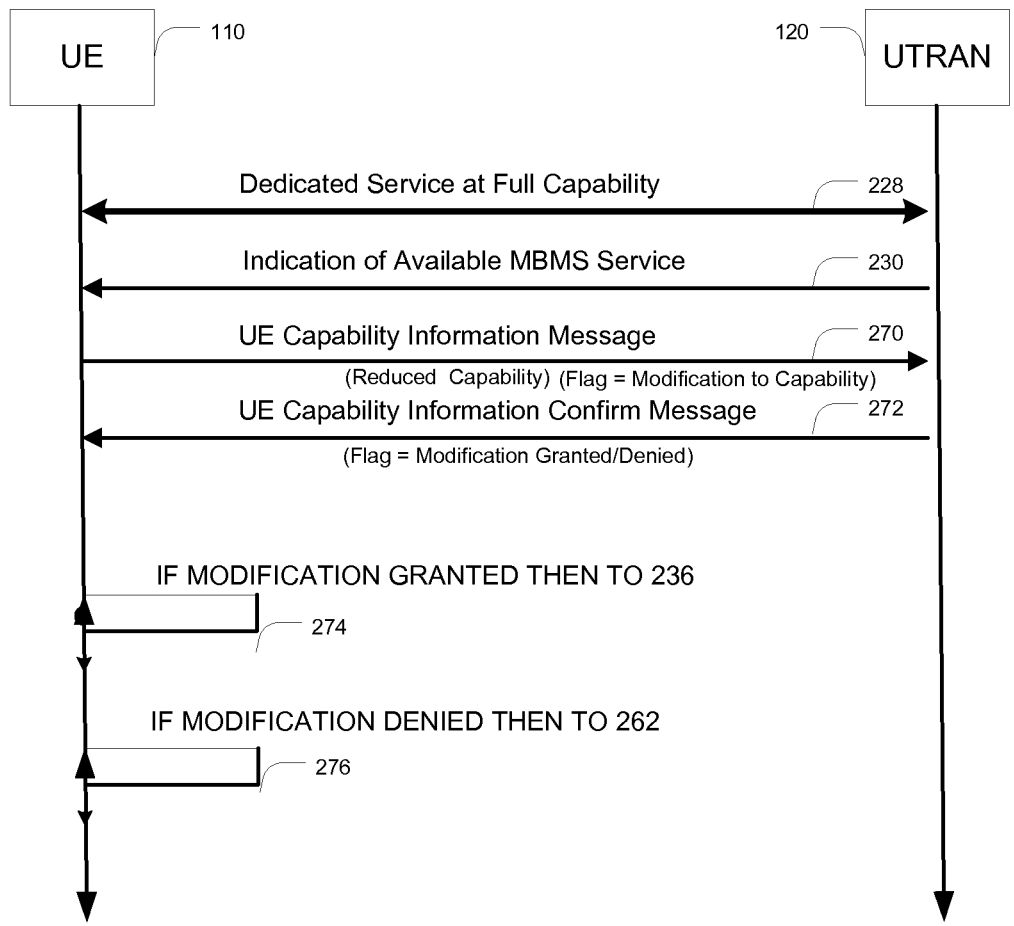
FIG. 4 illustrates a flowchart for conflict resolution of competing services, in accordance with another embodiment of the present invention.

FIG. 4 illustrates another embodiment for resolving conflicts in systems of varying ability to facilitate simultaneous receipt of services. While a UE capable of requesting modifications of previously stated capabilities may be configured accordingly, a UTRAN within which the UE may interact may have varying levels of sophistication and capability with regard to intrasession reconfigurations. In the present embodiment, a dedicated service has been commenced 228 as describe above with respect to FIGS. 2A-2B.

Similarly, during the course of engaging in the dedicated services between the UE and the UTRAN, the UE detects 230 an indication of an available MBMS. The UE determines the desirability of simultaneously supporting both the dedicated service and the MBMS, however, the capabilities (e.g., processing, storage, etc.) of the UE are inadequate of simultaneously sustaining both the MBMS and the dedicated service at the current data rate (i.e., at the data rate agreed during the exchange of the UE's specific capabilities).

Accordingly, once an MBMS has been detected 230 and when the capabilities of the UE are insufficient at current data rates to simultaneously process both services, the UE informs the UTRAN, and more specifically the PS bearer, that the UE desires to restate or redisclose the UE's capability information at a modified level. In the present embodiment, one or more flags are associated with the USER CAPABILITY INFORMATION message to indicate a requested intrasession modification to the UE capability rather than and original statement of the UE's capabilities as performed at the establishment of a dedicated session. A UTRAN can differently interpret a request for a modification rather then interpreting the request as an indication of the inability to sustain the current session.

Accordingly, the UE sends 270 a USER CAPABILITY INFORMATION message including the UE's specific modified capabilities as describe above and a flag noting the modification of an already stated UE capability. The UTRAN sends 272 a UE CAPABILITY INFORMATION CONFIRM message acknowledging receipt of the UE's modified capability information. After the UE's capabilities have been exchanged and confirmed, the UE may begin timing according to FIG. 3 to reconfigure according to FIG. 2B, if the reconfiguration message is received or choose 262 based upon prioritization if a reconfiguration message is not received.

In yet another embodiment, the UTRAN may include another flag in the in the UE CAPABILITY INFORMATION CONFIRM message designating whether the modification request was granted 274 or denied 276. If the modification was granted 274, then the UE anticipates a reconfiguration message 236 and processing continues as described above with reference to FIG. 2B. If the modification was denied 276, then the UE chooses 262 one of the services to support based on an internal prioritization as described above with reference to FIG. 3.

Figure 5:
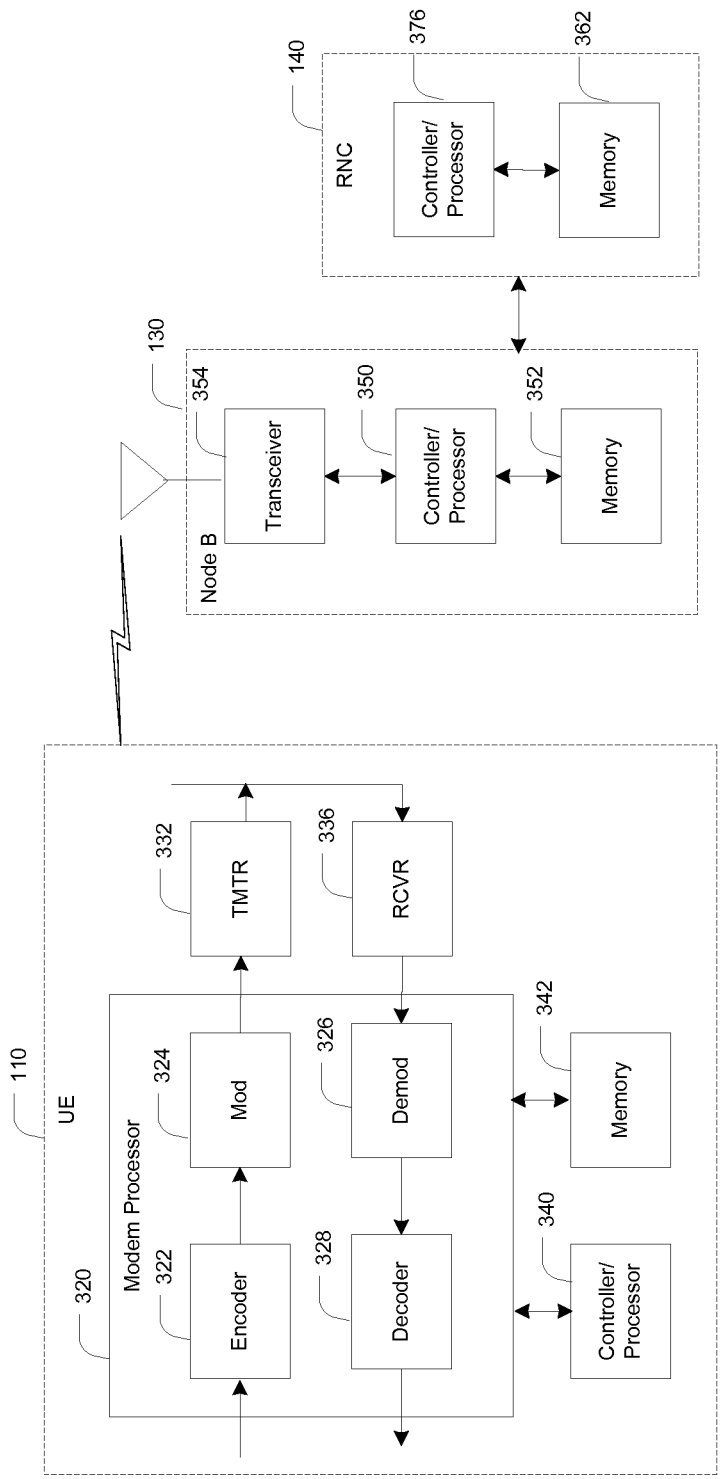
FIG. 5 illustrates a block diagram of a system for facilitating simultaneous reception of services and conflict resolution, in accordance with an embodiment of the present invention.

FIG. 5 shows a block diagram of an embodiment of UE 110, Node B 130, and RNC 140 in FIG. 1. On the uplink, data and signaling to be sent by UE 110 are processed (e.g., formatted, encoded, and interleaved) by an encoder 322 and further processed (e.g., modulated, channelized, and scrambled) by a modulator (Mod) 324 to generate output chips. A transmitter (TMTR) 332 then conditions (e.g., converts to analog, filters, amplifies, and frequency upconverts) the output chips and generates an uplink signal, which is transmitted via an antenna 334. On the downlink, antenna 334 receives a downlink signal transmitted by Node B 130. A receiver (RCVR) 336 conditions (e.g., filters, amplifies, frequency downconverts, and digitizes) the received signal from antenna 334 and provides samples. A demodulator (Demod) 326 processes (e.g., descrambles, channelizes, and demodulates) the samples and provides symbol estimates. A decoder 328 further processes (e.g., deinterleaves and decodes) the symbol estimates and provides decoded data. Encoder 322, modulator 324, demodulator 326, and decoder 328 may be implemented by a modem processor 320. These units perform processing in accordance with the radio technology (e.g., W-CDMA or cdma2000) used by the network.

A controller/processor 340 directs the operation of various units at UE 110. Controller/processor 340 may perform the processes or steps described in FIGS. 2A-4 and/or other processes for the techniques described herein. A memory 342 stores program codes and data for UE 110, e.g., UE capabilities, data rates, timers for servicing dedicated and MBMSs.

FIG. 5 also shows an embodiment of Node B 130 and RNC 140. Node B 130 includes a controller/processor 350 that performs various functions for communication with UE 110, a memory 352 that stores program codes and data for Node B 130, and a transceiver 354 that supports radio communication with UE 110. Controller/processor 350 may perform the processes or steps described in FIGS. 2A-4 and/or other processes for the techniques described herein. RNC 140 includes a controller/processor 360 that performs various functions to support communication for UE 110 and a memory 362 that stores program codes and data for RNC 140 for servicing dedicated and MBMSs.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

The invention claimed is:

1. A method comprising:
   determining, at a receiving station, a modified capability for maintaining reception of a first service while supporting a broadcast service, wherein the modified capability is a modification of a capability associated with the first service; and
   communicating an indication of the modified capability to a transmitting station, wherein the indication includes a flag indicating that the modified capability is the modification and not an original capability associated with the first service when the flag is asserted, and wherein the original capability is associated with establishment of a communication session with the transmitting station.

2. The method of claim 1, wherein the capability is used during a first time period and the modified capability is used during a second time period that is subsequent to the first time period.

3. The method of claim 1, further comprising reconfiguring the first service according to a particular capability after the broadcast service terminates.

4. A wireless communication device comprising:
   a memory configurable to store instructions comprising:
   instructions to determine a modified capability for maintaining reception of a first service while supporting a broadcast service, wherein the modified capability is a modification of a capability associated with the first service; and
   instructions to communicate an indication of the modified capability to a transmitting station, wherein the indication includes a flag that indicates that the modified capability is available for reconfiguring the first service; and
   at least one processor configured to execute the instructions.

5. The wireless communication device of claim 4, wherein the modification includes an intra-session modification.

6. The wireless communication device of claim 4, wherein the first service includes a dedicated service.

7. The wireless communication device of claim 4, wherein the memory is further configurable to store instructions to reconfigure the first service according to the modified capability.

8. The wireless communication device of claim 7, wherein the instructions to reconfigure the first service include instructions to reconfigure the first service from the capability to the modified capability.

9. An apparatus comprising:
   means for determining, at a receiving station, a modified capability for maintaining reception of a first service while supporting a broadcast service, wherein the modified capability is a modification of a capability associated with the first service; and
   means for communicating an indication of the modified capability to a transmitting station, wherein the indication includes a flag that indicates that the modified capability is available for reconfiguring the first service.

10. The apparatus of claim 9, further comprising means for receiving one of a grant flag or a deny flag from the transmitting station based at least in part on the indication communicated to the transmitting station.

11. The apparatus of claim 9, further comprising means for indicating a timeout when reconfiguration of the first service fails to occur within a time period after the indication of the modified capability is communicated to the transmitting station.

12. The apparatus of claim 11, wherein the time period begins after receiving a confirmation of reception of the indication by the transmitting station.

13. The apparatus of claim 9, further comprising means for monitoring a timer to determine when a time period has elapsed after the indication of the modified capability is communicated to the transmitting station.

14. The apparatus of claim 13, further comprising means for choosing one of the first service and the broadcast service in response to a determination that the time period has elapsed.

15. A non-transitory computer-readable medium comprising instructions executable by a computer to cause the computer to:
   determine a modified capability for maintaining reception of a first service while supporting a broadcast service, wherein the modified capability is a modification of a capability associated with the first service; and
   communicate an indication of the modified capability to a transmitting station wherein the indication includes a flag that indicates that the modified capability is available for reconfiguring the first service.

16. The non-transitory computer-readable medium of claim 15, wherein the capability is used at a time when the modified capability is determined.

17. The non-transitory computer-readable medium of claim 15, wherein the modified capability is based on at least one of a processing capability and a buffering capability necessary to support the first service and the broadcast service.

18. The non-transitory computer-readable medium of claim 15, further comprising instructions executable by the computer to cause the computer to communicate modification capability information associated with the modified capability to the transmitting station.

19. The non-transitory computer-readable medium of claim 18, wherein the modification capability information includes a modified data rate associated with the first service.

20. A method comprising:
   determining, by at least one processor, a modified capability of a receiving station for maintaining reception of a first service while supporting a broadcast service, wherein the modified capability is a modification of a capability associated with the first service; and communicating an indication of the modified capability to a transmitting station, wherein the indication includes a flag that indicates that the modified capability is available for reconfiguring the first service.

21. The method of claim 20, further comprising receiving one of a grant flag or a deny flag from the transmitting station based at least in part on the indication communicated to the transmitting station.

22. The method of claim 20, further comprising indicating a timeout when reconfiguration of the first service fails to occur within a time period after the indication of the modified capability is communicated to the transmitting station.

23. The method of claim 22, wherein the time period begins after receiving a confirmation of reception of the indication by the transmitting station.

24. The method of claim 20, further comprising monitoring a timer to determine when a time period has elapsed, wherein the time period is associated with the indication of the modified capability being communicated to the transmitting station.

25. The method of claim 24, further comprising choosing one of the first service and the broadcast service in response to a determination that the time period has elapsed.

26. A processor comprising:
a first module configured to determine a modified capability for maintaining reception of a first service while supporting a broadcast service, wherein the modified capability is a modification of a capability associated with the first service; and
a second module configured to communicate an indication of the modified capability to a transmitting station wherein the indication includes a flag that indicates that the modified capability is available for reconfiguring the first service.

27. The processor of claim 26, wherein the capability is used at a time when the modified capability is determined.

28. The processor of claim 26, wherein the modified capability is based on at least one of a processing capability and a buffering capability necessary to support the first service and the broadcast service.

29. The processor of claim 26, further comprising a third module configured to communicate modification capability information associated with the modified capability.

30. The processor of claim 29, wherein the modification capability information includes a modified data rate associated with the first service.

31. An apparatus comprising:
at least one processor comprising:
means for determining a modified capability for maintaining reception of a first service while supporting a broadcast service, wherein the modified capability is a modification of a capability associated with the first service; and
means for communicating an indication of the modified capability to a transmitting station wherein the indication includes a flag that indicates that the modified capability is the modification and not an original capability associated with the first service when the flag is asserted, and wherein the original capability is associated with establishment of a communication session with the transmitting station.

32. The apparatus of claim 31, further comprising:
means for using the capability with respect to the first service during a first time period; and
means for using the modified capability with respect to the first service during a second time period, wherein the second time period is subsequent to the first time period.

33. The apparatus of claim 31, further comprising means for reconfiguring the first service according to a particular capability after the broadcast service terminates.

34. A non-transitory computer-readable medium comprising processor-executable instructions that, when executed by a processor, cause the processor to:
determine a modified capability for maintaining reception of a first service while supporting a broadcast service, wherein the modified capability is a modification of a capability associated with the first service; and
communicate an indication of the modified capability to a transmitting station the indication includes a flag that indicates that the modified capability is available for reconfiguring the first service.

35. The non-transitory computer-readable medium of claim 34, wherein the modification includes an intra-session modification.

36. The non-transitory computer-readable medium of claim 34, wherein the first service includes a dedicated service.

37. The non-transitory computer-readable medium of claim 34, wherein the indication is a flag that indicates that the modified capability is available for reconfiguring the first service.

38. The non-transitory computer-readable medium of claim 37, further comprising processor-executable instructions that, when executed by the processor, cause the processor to reconfigure the first service according to the modified capability.

39. The non-transitory computer-readable medium of claim 38, wherein reconfiguring the first service includes reconfiguring the first service from the capability to the modified capability.

* * * * *